(12) United States Patent
Murase et al.

(10) Patent No.: US 10,593,359 B2
(45) Date of Patent: *Mar. 17, 2020

(54) MAGNETIC RECORDING MEDIUM SUBSTRATE AND HARD DISK DRIVE

(71) Applicant: SHOWA DENKO K.K., Tokyo (JP)

(72) Inventors: Isao Murase, Tochigi (JP); Kiminori Sugimoto, Osaka (JP)

(73) Assignee: SHOWA DENKO K.K., Tokyo (JP)

( * ) Notice: Subject to any disclaimer, the term of this patent is extended or adjusted under 35 U.S.C. 154(b) by 281 days.

This patent is subject to a terminal disclaimer.

(21) Appl. No.: 15/621,319

(22) Filed: Jun. 13, 2017

(65) Prior Publication Data

US 2018/0012622 A1    Jan. 11, 2018

(30) Foreign Application Priority Data

Jul. 8, 2016    (JP) ................................ 2016-136290

(51) Int. Cl.
*G11B 5/73*    (2006.01)
*G11B 5/858*    (2006.01)
*G11B 5/48*    (2006.01)

(52) U.S. Cl.
CPC ........ *G11B 5/73913* (2019.05); *G11B 5/4806* (2013.01); *G11B 5/7315* (2013.01); *G11B 5/73919* (2019.05); *G11B 5/858* (2013.01)

(58) Field of Classification Search
None
See application file for complete search history.

(56) References Cited

U.S. PATENT DOCUMENTS

| 4,077,810 | A | * | 3/1978 | Ohuchi | C22C 21/04 148/439 |
| 4,163,266 | A | * | 7/1979 | Tamamura | C22C 21/02 360/130.21 |
| 4,412,870 | A | * | 11/1983 | Vernam | C22C 21/06 148/439 |

(Continued)

FOREIGN PATENT DOCUMENTS

| CN | 104109783 | 10/2014 |
| CN | 104303231 | 1/2015 |

(Continued)

OTHER PUBLICATIONS

Office Action dated Sep. 12, 2019 issued with respect to the related U.S. Appl. No. 15/866,831.

*Primary Examiner* — Kevin M Bernatz
(74) *Attorney, Agent, or Firm* — IPUSA, PLLC

(57) ABSTRACT

A magnetic recording medium substrate is provided in which a NiP type plating film is formed on a surface of an aluminum alloy substrate that includes Si in a range of 9.5 mass % or more and 11.0 mass % or less, Mn in a rage of 0.45 mass % or more and 0.90 mass % or less, Zn in a range of 0.32 mass % or more and 0.38 mass % or less, Sr in a range of 0.01 mass % or more and 0.05 mass % or less. In the alloy structure of the aluminum alloy substrate, an average particle diameter of Si particles is 2 μm or less, the film thickness of the NiP type plating film is 7 μm or more. An outer diameter of the magnetic recording medium substrate is 53 mm or more, the thickness is 0.9 mm or less, and the Young's modulus is 79 GPa or more.

6 Claims, 2 Drawing Sheets

(56) References Cited

U.S. PATENT DOCUMENTS

| | | | |
|---|---|---|---|
| 4,826,737 A * | 5/1989 | Yamada | C22C 21/06 148/522 |
| 5,028,393 A * | 7/1991 | Tanaka | C22C 21/003 148/439 |
| 5,707,705 A * | 1/1998 | Nelson | G11B 5/7315 204/192.1 |
| 6,124,039 A * | 9/2000 | Goetz | C22C 21/00 216/102 |
| 6,316,097 B1 * | 11/2001 | Liu | G11B 5/7325 428/332 |
| 6,332,906 B1 * | 12/2001 | Haynes | B22F 3/20 419/28 |
| 6,490,123 B1 | 12/2002 | Okunaga et al. | |
| 8,404,369 B2 * | 3/2013 | Ruffini | G11B 5/653 428/832.3 |
| 9,038,704 B2 * | 5/2015 | Williamson | B22D 21/04 164/113 |
| 9,613,648 B2 * | 4/2017 | Kitawaki | C23C 18/1651 |
| 9,875,765 B2 * | 1/2018 | Yukimatsu | G11B 5/7315 |
| 2003/0143102 A1 * | 7/2003 | Matsuoka | C22C 21/04 420/546 |
| 2005/0238929 A1 * | 10/2005 | Uwazumi | G11B 5/667 428/848 |
| 2007/0195457 A1 | 8/2007 | Matono et al. | |
| 2008/0318081 A1 * | 12/2008 | Steins | C22C 21/02 428/640 |
| 2014/0036644 A1 | 2/2014 | Matsumoto et al. | |
| 2014/0334276 A1 | 11/2014 | Matsumoto et al. | |
| 2017/0327930 A1 * | 11/2017 | Kitawaki | C22C 21/00 |
| 2018/0012622 A1 | 1/2018 | Murase et al. | |
| 2018/0226095 A1 * | 8/2018 | Murase | G11B 5/73 |
| 2019/0062878 A1 * | 2/2019 | Murase | G11B 5/7315 |

FOREIGN PATENT DOCUMENTS

| | | |
|---|---|---|
| JP | H06-145927 | 5/1994 |
| JP | H10-105960 | 4/1998 |
| JP | 2002-150745 | 5/2002 |
| JP | 2009-024265 | 2/2009 |
| JP | 2015-026414 | 2/2015 |

* cited by examiner

MAGNETIC RECORDING MEDIUM SUBSTRATE AND HARD DISK DRIVE

BACKGROUND OF THE INVENTION

1. Field of the Invention

The present invention relates to a magnetic recording medium substrate and a hard disk drive.

2. Description of the Related Art

In recent years, with respect to a magnetic recording medium used for a hard disk drive, recording density has significantly increased. In particular, surface recording density has further drastically increased since introduction of MR (magneto resistive) head and PRML (Partial Response Maximum Likelihood) technology.

Furthermore, due to development of the Internet and expanded utilization of "Big Data" in recent years, the data accumulation amount at data centers has been continuously increasing, and thus, due to spatial limitations at the data centers, increases in memory capacity per unit volume are required. In other words, in order to increase memory capacity per standardized hard disk drives, attempts have been made for increasing the number of magnetic recording media stored inside drive cases in addition to attempts to increase memory capacity per magnetic recording medium.

As a magnetic recording medium substrate, an aluminum alloy substrate and a glass substrate are mainly used. In the substrates described above, the aluminum alloy substrate has a toughness higher than the glass substrate, and is easier to manufacture, and thus, the aluminum alloy substrate is used for a magnetic recording medium with a relatively large diameter. The thickness of an aluminum alloy substrate, which is used for a magnetic recording medium of a typical 3.5-inch standardized hard disk drive, is 1.27 mm, and up to five (5) aluminum alloy substrates are used inside the drive case.

In order to increase the number of magnetic recording media stored inside a drive case, attempts have been made for making thinner the thickness of the substrate used for the magnetic recording medium. However, in the case where the thickness of the substrate is made thinner, compared with a glass substrate, the aluminum alloy substrate tends to generate "fluttering". F is a phenomenon generated in a magnetic recording medium in the case where the magnetic recording medium is rotated at a high speed. When the fluttering is generated, it becomes difficult to perform stable reading in the hard disk drive.

In order to reduce the fluttering, in the glass substrate, for example, it is known that a material with high Young's modulus is used as a material of a magnetic recording medium substrate (for example, refer to Patent Document 1).

Further, it is known that the fluttering of the substrate is reduced by filling helium gas inside the drive case of a 3.5-inch standardized hard disk drive, and thus, the thickness of the aluminum alloy substrate is made thinner and six or more aluminum alloy substrates are stored inside the drive case.

In general, an aluminum alloy substrate is manufactured according to the following process. First, punching in a donut shape is performed on an aluminum alloy plate with a thickness of approximately 2 mm or less, and a substrate with a desired size is obtained. Next, after performing inner and outer diameter chamfering and data surface turning on the substrate obtained by the punching, in order to reduce surface roughness and undulation after the lathe manufacturing, grinding is performed by using a grindstone. Afterwards, in order to provide surface hardness and reduce surface defect, NiP plating is performed on the substrate surface. Next, polishing processing is performed for both surfaces (data surfaces) of the substrate on which NiP plating films have been formed. Substrates for magnetic recording mediums are mass production products, and high cost-performance is required for magnetic recording mediums. Therefore, high machinability and inexpensiveness are required for the aluminum alloy used for the substrates.

Patent Document 2 discloses a material as an aluminum alloy with superior machinability, capable of reducing the wear, chipping, etc., of cutting tools, and with further improved Alumite processability. The material includes Mg: 0.3 to 6 mass %, Si: 0.3 to 10 mass %, Zn: 0.05 to 1 mass %, and Sr: 0.001 to 0.3 mass %, with the balance being Al and impurities.

CITATION LIST

Patent Literature

[Patent Document 1] Japanese Unexamined Patent Application Publication No. 2015-26414
[Patent Document 2] Japanese Unexamined Patent Application Publication No. 2009-24265

SUMMARY OF THE INVENTION

The present invention has been proposed in view of the above. It is an object of the present invention to provide a magnetic recording medium substrate that is capable of increasing the number of magnetic recording media stored in a standardized hard disk drive case, that is capable of corresponding to thinning the thickness, that generates less fluttering, and that has superior machinability.

According to an aspect of an embodiment of the present invention, a magnetic recording medium substrate in which a NiP type plating film is foiled on a surface of an aluminum alloy substrate is provided. The aluminum alloy substrate includes Si in a range of 9.5 mass % or more and 11.0 mass % or less, Mn in a rage of 0.45 mass % or more and 0.90 mass % or less, Zn in a range of 0.32 mass % or more and 0.38 mass % or less, Sr in a range of 0.01 mass % or more and 0.05 mass % or less. In the alloy structure of the aluminum alloy substrate, an average particle diameter of Si particles is 2 μm or less, the thickness of the NiP type plating film is 7 μm or more. With respect to the magnetic recording medium substrate, the outer diameter is 53 mm or more, the thickness is 0.9 mm or less, and the Young's modulus (E) is 79 GPa or more.

In a magnetic recording medium substrate according to an embodiment of the present invention, the fluttering is reduced, and thus, the substrate is capable of thinning the thickness. It is possible for the substrate to provide a hard disk drive with high recording capacity by increasing the number of magnetic recording media stored inside a standardized hard disk drive case.

Further, according to the magnetic recording medium substrate, the machinability is high and the substrate can be manufactured with low cost, and thus, it is possible to reduce a bit unit price of the hard disk drive with high recording capacity.

Further, according to the magnetic recording medium substrate, it is possible to reduce the fluttering in the air, and thus, it is not required to fill a low-molecular-weight gas such as helium inside the hard disk drive case, and it is possible to reduce manufacturing cost of the hard disk drive with high recording capacity.

DETAILED DESCRIPTION OF THE PREFERRED EMBODIMENTS

Figure 1:
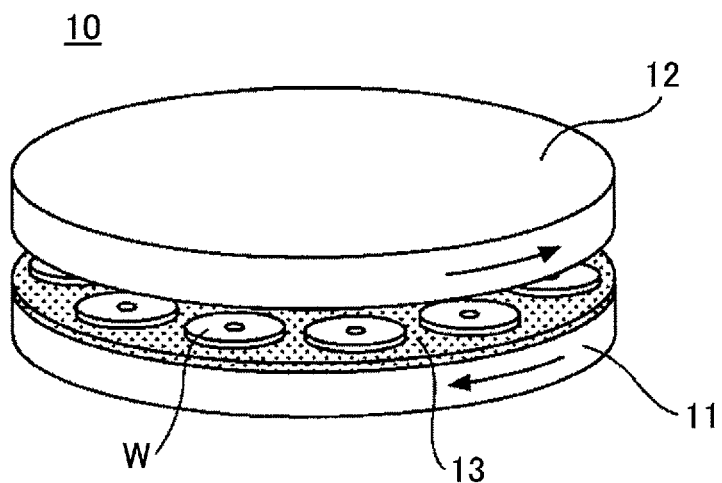
FIG. 1 is a perspective view illustrating a manufacturing process of a magnetic recording medium substrate to which an embodiment of the present invention is applied.

In the following, a magnetic recording medium substrate according to an embodiment of the present invention will be described in detail.

A magnetic recording medium substrate according to the present embodiment, in which a NiP type plating film is formed on a surface of an aluminum alloy substrate, is provided. The aluminum alloy substrate includes Si in a range of 9.5 mass % or more and 11.0 mass % or less, Mn in a rage of 0.45 mass % or more and 0.90 mass % or less, Zn in a range of 0.32 mass % or more and 0.38 mass % or less, Sr in a range of 0.01 mass % or more and 0.05 mass % or less. In the alloy structure of the aluminum alloy substrate, an average particle diameter of Si particles is 2 μm or less, the thickness of the NiP type plating film is 7 μm or more, preferably, 10 μm or more. With respect to the magnetic recording medium substrate, the outer diameter is 53 mm or more, the thickness is 0.9 mm or less, and the Young's modulus (E) is 79 GPa or more.

In the magnetic recording medium substrate according to the present embodiment, a NiP type plating film is formed on a surface of a disk-shaped aluminum alloy substrate that has an aperture in the center. Further, in a magnetic recording medium in which the magnetic recording medium substrate is used, a magnetic layer, a protection layer, a lubricating film, etc., are laminated in this order on a surface of the magnetic recording medium substrate. Further, in a hard disk drive in which the magnetic recording medium is used, the center portion of the magnetic recording medium is attached to a rotation shaft of a spindle motor, and information is written to or read from the magnetic recording medium while a magnetic head is lifted and moved above the surface of the magnetic recording medium that is rotationally driven by the spindle motor.

In the hard disk drive, the magnetic recording medium is rotated fast at 5000 rpm or more, and thus, if machinability of the magnetic recording medium is low, then fluttering is generated and it becomes difficult for the hard disk drive to perform stable reading. Inventors of the present invention have found that there is a close relationship between fluttering of the magnetic recording medium substrate and its Young's modulus and density, that fluttering can be reduced by increasing the Young's modulus of the magnetic recording medium and by decreasing the density, and that, in particular, it becomes possible to manufacture a magnetic recording medium whose outer diameter is 53 mm or more and whose thickness is 0.9 mm or less by causing the Young's modulus of the magnetic recording medium substrate to be 79 GPa or more.

A magnetic recording medium substrate according to the present embodiment is an aluminum alloy substrate whose composition includes: Si in a range of 9.5 mass % or more and 11.0 mass % or less, preferably in a range of 9.7 mass % or more and 10.4 mass % or less; Mn in a range of 0.45 mass % or more and 0.90 mass % or less, preferably in a range of 0.47 mass % or more and 0.80 mass % or less; Zn in a range of 0.32 mass % or more and 0.38 mass % or less, preferably in a range of 0.33 mass % or more and 0.37 mass % or less; Sr in a range of 0.01 mass % or more and 0.05 mass % or less, preferably in a range of 0.02 mass % or more and 0.04 mass % or less, and, in the alloy structure, an average particle diameter of Si particles is 2 μm or less, preferably 1.7 μm or less. An aluminum alloy substrate according to the present embodiment includes four elements, Si, Mn, Zn, and Sr as essential additive elements, includes other additive elements to be added appropriately, and includes the balance being Al and unavoidable impurities.

Because composition of an aluminum alloy substrate according to the present embodiment includes Si in large quantities, it is possible to dramatically increase Young's modulus of the aluminum alloy substrate. However, inside the alloy that includes Si in large quantities, there are Si particles dispersed in large quantities, and thus, there is a case in which the Si particles ultimately grow into 5 to 10 μm in size according to manufacturing conditions. Further, when there are Si particles described above in an aluminum alloy substrate, an NiP type plating film on its surface cannot be formed uniformly, and thus, there is a case in which film quality of the plating film becomes not uniform.

In order to solve the problem described above, in the present embodiment, Sr is added to the composition of the aluminum alloy substrate, and thus, Si particles are caused to be rounded and fined, and the NiP type plating film on its surface is caused to be uniform. Further, the rounding and fining Si particles according to the present embodiment have an effect of increasing machinability of the aluminum alloy.

In the following, each of the additive elements will be described in detail.

Since only a small amount of Si can be dissolved in aluminum, Si is dispersed in the matrix as single particles of Si except for the amount required for compound formation. In the alloy structure in which Si particles are dispersed, since the Si particles are ground by a cutting tool and/or the Si particle and the aluminum base phase are peeled at the interface, the chips can be easily broken, resulting in improved machinability. Furthermore, the Si particles are rounded and fined by Sr added as an essential element, or by Na and Ca added as optional elements, which also improves the machinability. If Si content is less than 9.5 mass %, then effects of increasing Young's modulus of the alloy will be reduced and sufficient chip breaking effects cannot be obtained. In contrast, if Si content exceeds 11.0 mass %, then, the chip breaking effects may be improved, but cutting tool damages such as abrasion or chipping may occur heavily, which deteriorates productivity of the magnetic recording medium substrate.

Mn finely precipitates in the alloy matrix and has effects of improving the mechanical properties. If Mn content is less than 0.45 mass %, then the effects may be insufficient. If Mn content exceeds 0.90 mass %, then the effects will be saturated and the mechanical properties cannot be improved.

Zn dissolves in the alloy matrix, while Zn bonds with other additives and is dispersed in the matrix as a precipitate. As a result, Zn improves the mechanical properties of the aluminum alloy and, according to the synergistic effects with other solid solution type elements, improves machinability of the alloy. If Zn content is less than 0.32 mass %, then the above effects may be insufficient. In contrast, if Zn content exceeds 0.38 mass %, then there is a risk of deteriorated corrosion resistance.

Sr, by coexisting with Si, causes eutectic Si at the time of solidification and proeutectic Si (initial crystal Si, primary crystal Si) to be rounded to 2 μm or less in diameter, preferably, to 1.7 μm or less, and also to be fined. This indirectly improves the chip separability, which in turn improves the machinability and reduces abrasion and damages on a cutting tool.

Furthermore, Sr has effects of causing Si particles to be dispersed uniformly and finely in the processes of continuous casting, extrusion, drawing, etc., thereby further improving the machinability. In addition, Sr causes the structure of the NiP type plating film on the surface of the aluminum alloy substrate to be uniform, and causes the film quality of the plating film to be uniform. In other words, in the case where a conventional aluminum alloy, which includes Si in large quantities, is used for a magnetic recording medium substrate, the NiP type plating cannot be easily formed on the surface of Si particles, and defects including a recess, a pit, etc., tend to be generated at a place where the NiP type plating cannot be easily formed. It is an object of the present invention to provide a magnetic recording medium substrate that solves the conventional problem described above and has a uniform plating film.

It should be noted that, if Sr content is less than 0.01 mass %, then, the effect may be insufficient, Si particles may not be rounded, and sharp corners may be created, and thus, a cutting tool may be abraded heavily. In contrast, if Sr exceeds 0.05 mass %, then, the effect may be saturated, resulting in insufficient meaning of adding Sr in large quantities. Further, initial SrAl4 is crystallized and the NiP type plating is not easily formed, and thus, a defect including a recess, a pit, etc., tends to be generated at a place where initial SrAl4 is crystallized and the NiP type plating is not easily formed.

In an aluminum alloy substrate according to the present embodiment, it is preferable that Mg content should be 0.01 mass % or less, or that Mg should not be included. An aluminum alloy according to the present embodiment is categorized as what is termed as a 4000 series aluminum silicon alloy, and it is technically well known that Mg is added to the 4000 Series Aluminum Silicon Alloy. With respect to the above, in an aluminum alloy substrate according to the present embodiment, it is assumed that Mg content is 0.01 mass % or less, or that Mg is not included, and thus, effects of Sr addition are further effective and eutectic Si and proeutectic Si are rounded and fined.

Other additive elements to be appropriately added to the aluminum alloy substrate include Fe, Cu, Cr, Ti, Pb, Bi, Zr, B, V, Na, and Ca. Addition amounts of these elements are each 1 mass % or less, or zero. Further, a total of the addition amounts of these elements should be 4 mass % or less. Effects of adding these elements include, as are known for the 4000 series aluminum silicon alloy, improvement of casting characteristics (fluidity, shrinkage characteristics, hot crack resistance), improvement of mechanical properties, improvement of machinability, and grain refinement. With respect to the above, if the addition amounts of these additive elements each exceed 1 mass % or the total exceeds 4 mass %, then additive effects of essential additive elements, Si, Mn, Zn, and Sr will be reduced, which is not preferable. In particular, in the case where the additive effects of essential additive elements should be enhanced, it is preferable to cause each of the addition amounts of the additive elements to be preferably 0.5 mass % or less. It is further preferable to cause each of the addition amounts of the additive elements to be 0.1 mass % or less.

An aluminum alloy substrate according to the present embodiment can be manufactured by using a known method. For example, a composition-adjusted alloy material is heated and melted, and then, the melted material is casted and rolled to form a plate material. Afterwards, the plate material is processed to obtain a disk-like plate of a specified size with an aperture in the center. Further, by providing heating and annealing processes before and after the processing steps for the disk-like plate, it is possible to reduce distortion existing inside the substrate and to adjust the Young's modulus of the substrate within a proper range.

It is assumed that an outer diameter of an aluminum alloy substrate according to the present embodiment is 53 mm or more. As described above, an aluminum alloy substrate according to the present embodiment is used for the purpose of increasing the number of magnetic recording media stored in the standardized hard disk drive cases. Therefore, it is required that the substrate should be stored in a 2.5 inch hard disk drive, an 3.5 inch hard disk drive, etc. Further, a substrate, whose maximum diameter is approximately 67 mm, is used for the 2.5 inch hard disk drive, and a substrate, whose maximum diameter is approximately 97 mm, is used for the 3.5 inch hard disk drive. Therefore, it is required that an outer diameter of an aluminum alloy substrate according to the present embodiment should be 53 mm or more.

Further, it is especially preferable that an aluminum alloy substrate according to the present embodiment is used for the 3.5 inch hard disk drive that has higher capacity. In the typical 3.5 inch standardized hard disk drive, up to five media, whose thickness is 1.27 mm, are stored. With respect to the above, it is possible to make the thickness of a magnetic recording medium substrate according to the present embodiment be 0.9 mm or less, and thus, it is possible to store six media or more. Further, a magnetic recording medium substrate according to the present embodiment has high resistance to the fluttering. Therefore, the substrate can be used in air and it is not required to fill a low-molecular-weight gas such as helium inside the hard disk drive case, resulting in reduction in manufacturing cost of the hard disk drives with high recording capacity.

On a surface of a magnetic recording medium substrate according to the present embodiment, an NiP type plating film, whose thickness is 7 μm or more, preferably 10 μm or more, is formed. The thickness of an NiP type plating film used for a typical magnetic recording medium substrate is less than 7 μm. In the present embodiment, the thickness of the NiP type plating film is increased, and thus, the Young's modulus of the magnetic recording medium substrate is increased to 79 GPa or more.

An NiP alloy is used for the NiP type plating film according to the present embodiment. It is preferable that the NiP alloy should include P in a range of 10 mass % or more and 15 mass % or less, and include the balance being Ni and unavoidable impurities. By configuring the NiP type plating film as described above, it is possible to increase the Young's modulus of the magnetic recording medium substrate as compared with the before-plating substrate.

Further, in the present embodiment, it is preferable that an NiWP type alloy should be used as the NiP type plating film, and that the NiWP type alloy should include W in a range of 15 mass % or more and 22 mass % or less, P in a range of 3 mass % or more and 10 mass % or less, other additive elements to be added appropriately, and the balance being Ni and unavoidable impurities. By using the high hardness material described above as the NiP type plating film, it is possible to further increase the Young's modulus of the magnetic recording medium substrate.

The NiP type plating film can be formed by using a conventionally used method. Further, the NiWP type plating film can be also famed by using the similar method as the NiP type plating. For example, for the NiWP type plating film, a plating solution containing a W salt added to the NiP plating solution can be used. As the W salt, sodium tungstate, potassium tungstate, ammonium tungstate or the like may be used.

It is preferable that the plating should be performed by using electroless plating. It is possible to adjust the thickness of the plating layer according to immersion time in the plating solution and temperature of the plating solution. Although conditions at the time of plating is not specifically limited, it is preferable that pH of the plating bath should be 5.0 to 8.6, that the bath temperature should be 70 to 100 degrees Celsius, preferably 85 to 95 degrees Celsius, and that the immersion time should be 90 to 150 minutes.

It is preferable that heating treatment should be applied to the substrate after the plating. In particular, by applying the heating treatment at 300 or greater degrees Celsius, it is possible to further increase hardness of the plating film, and thus, it is possible to further increase the Young's modulus of the magnetic recording medium substrate.

In a magnetic recording medium substrate according to the present embodiment, in the case where the density is $\rho$ (g/cm$^3$), it is preferable that E/$\rho$ should be 29 or more.

As described above, inventors of the present invention have found that there is a close relationship between the fluttering of the magnetic recording medium substrate and the Young's modulus E and the density p, and that the fluttering can be reduced by increasing the Young's modulus of the magnetic recording medium and by decreasing the density. Here, with respect to the conventional aluminum substrate for magnetic recording medium, a 5000 series aluminum alloy is used in many cases. In these cases, the density is approximately 2.8 g/cm$^3$, and the Young's modulus is approximately 74 GPa, and thus, E/$\rho$ is approximately 26.4. On the other hand, with respect to the magnetic recording medium substrate according to the present embodiment, the Young's modulus is caused to be in a range of 79 GPa or more and 87 GPa or less, and the density is caused to be in a range of 2.7 g/cm$^3$ or more and 3.0 g/cm$^3$ or less, and thus, E/$\rho$ is caused to be 29 or more. Conventionally, an aluminum substrate for magnetic recording medium with NiP type plating film, whose E/$\rho$ is 29 or more, cannot be obtained. In the case where the aluminum substrate for magnetic recording medium with NiP type plating film, whose E/p is 29 or more, is used for the hard disk drive, the fluttering is reduced, and thus, extremely superior characteristics can be obtained.

In a manufacturing method of a magnetic recording medium substrate according to the present embodiment, after plating is applied to an aluminum alloy substrate, polishing processing is applied to the surface of the substrate. Further, in the present embodiment, in view of improving surface quality such as increased smoothness and decreased damages, and in view of improved productivity, it is preferable that a multi-step polishing method, in which two or more polishing steps using a plurality of independent polishing machines are included, should be employed.

Specifically, a rough polishing step and a finishing polishing step are executed as steps for the substrate surface polishing. In the rough polishing step, polishing is performed while supplying polishing liquid, which includes alumina abrasive grain, by using a first polishing machine.

In the finishing polishing step, after washing the magnetic recording medium substrate, polishing is performed while supplying polishing liquid, which includes colloidal silica abrasive grain, by using a second polishing machine.

Here, the first and second polishing machines each have, as illustrated in FIG. 1, for example, a pair of upper and lower platens 11, 12. The polishing is performed by sandwiching a plurality of substrates W between the platens 11, 12 that rotate in directions opposite to each other and by polishing both sides of the substrates W with polishing pads 13 disposed on the platens 11, 12.

Figure 2:
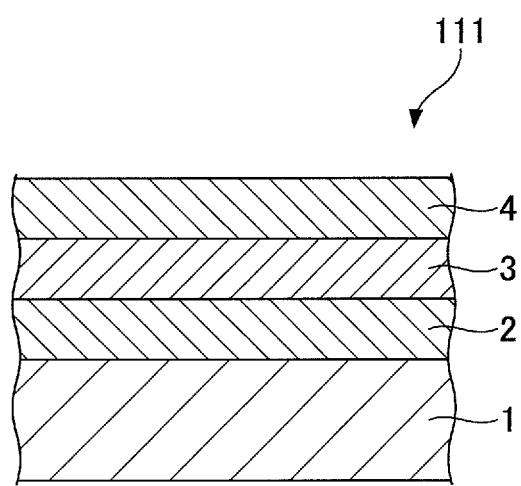
FIG. 2 is a schematic cross-sectional view illustrating an example of a magnetic recording medium according to an embodiment of the present invention.

In a magnetic recording medium 111 according to the present embodiment, for example, as shown in FIG. 2, a magnetic layer 2, a protection layer 3, and a lubricant layer 4 are laminated in this order on an aluminum substrate 1 for magnetic recording medium. Further, a publicly known lamination structure can be used for a magnetic recording medium according to the present embodiment.

Figure 3:
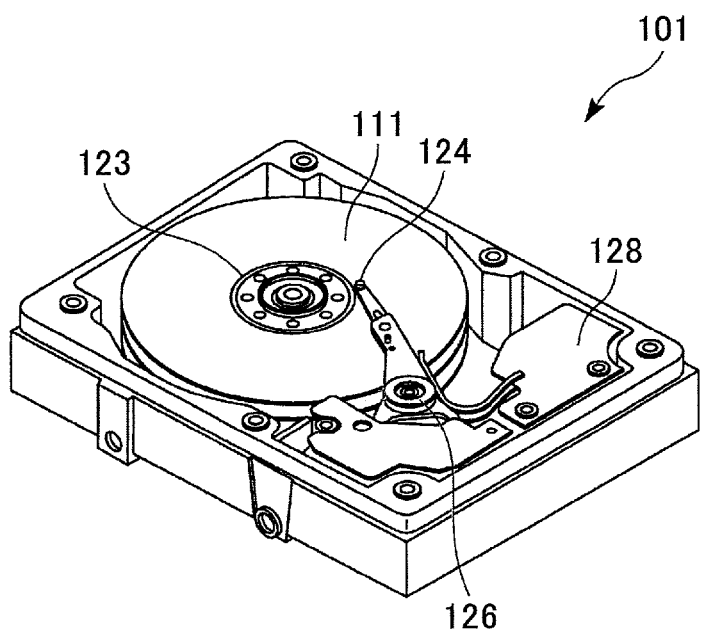
FIG. 3 is a perspective view illustrating an example of a hard disk drive according to an embodiment of the present invention.

A structure illustrated in FIG. 3, for example, can be used for a hard disk drive 101 according to the present embodiment. In other words, the hard disk drive 101 includes a magnetic recording medium 111, a medium driving unit 123 for driving the magnetic recording medium 111 in a recording direction, a magnetic head 124 including a recording unit and a reproducing unit, a head movement unit 126 for causing the magnetic head 124 to make relative movement with respect to the magnetic recording medium 111, and a recording/reproducing signal processing unit 128 for processing a recording/reproducing signal to/from the magnetic head 124.

In a magnetic recording medium substrate according to the present embodiment, the fluttering is reduced, and thus, the magnetic recording medium substrate is capable of thinning the thickness. It is possible for the magnetic recording medium substrate to provide a hard disk drive 101 with high recording capacity by increasing the number of magnetic recording media stored inside the standardized hard disk drive case.

Further, according to the magnetic recording medium substrate, it is possible to reduce the fluttering in the air, and thus, it is not required to fill a low-molecular-weight gas such as helium inside the hard disk drive case, and it is possible to reduce manufacturing cost of the hard disk drive 101 with high recording capacity.

Further, it is preferable that the hard disk drive 101 should be, in particular, used for the 3.5 inch standardized hard disk drive with high recording capacity.

EXAMPLES

Examples 1-12, and Comparative Examples 1-9

In the following, effects of the present invention will be described based on examples. It should be noted that the present invention is not limited to the following examples, and may be modified appropriately without departing from the scope the invention.

(Manufacturing of Aluminum Alloy Substrate)

A composition-adjusted alloy material according to compositions (aluminum alloy compositions) illustrated in Table 1 was produced according to direct chill casting.

It should be noted that the casting speed was 80 mm/minute. After the produced ingot was maintained at 450 degrees Celsius for five hours for the homogenization treatment, the ingot was rolled to produce a plate material with 1.2 mm thickness. Afterwards, the punching in a disk shape was performed on the plate material to form a 97-mm-outer-diameter disk with an aperture in the center. After annealing at 380 degrees Celsius for one hour, turning processing was performed on the surfaces and the end surface by using diamond bites to produce a 96-mm-outer-diameter substrate with thickness illustrated in Table 1. Crystal structures of the obtained aluminum alloy substrates were observed and Si particle sizes were measured. Measurement results in examples 1 to 12 and comparative examples 1 to 9 are illustrated in Table 1.

TABLE 1

| | ALUMINUM ALLOY COMPOSITION (MASS %) | | | | | SUBSTRATE THICKNESS (mm) | Si PARTICLE DIAMETER (μm) |
|---|---|---|---|---|---|---|---|
| | Si | Mn | Zn | Sr | Al | | |
| EXAMPLE 1 | 9.65 | 0.46 | 0.33 | 0.04 | BALANCE | 0.8 | 1.67 |
| EXAMPLE 2 | 9.65 | 0.46 | 0.33 | 0.04 | BALANCE | 0.8 | 1.67 |
| EXAMPLE 3 | 9.65 | 0.46 | 0.33 | 0.04 | BALANCE | 0.645 | 1.67 |
| EXAMPLE 4 | 9.65 | 0.46 | 0.33 | 0.04 | BALANCE | 0.645 | 1.67 |
| EXAMPLE 5 | 11.00 | 0.47 | 0.34 | 0.04 | BALANCE | 0.8 | 1.69 |
| EXAMPLE 6 | 9.50 | 0.48 | 0.36 | 0.03 | BALANCE | 0.8 | 1.60 |
| EXAMPLE 7 | 9.70 | 0.45 | 0.33 | 0.04 | BALANCE | 0.8 | 1.64 |
| EXAMPLE 8 | 9.60 | 0.90 | 0.35 | 0.04 | BALANCE | 0.8 | 1.68 |
| EXAMPLE 9 | 9.65 | 0.46 | 0.38 | 0.04 | BALANCE | 0.8 | 1.66 |
| EXAMPLE 10 | 9.65 | 0.46 | 0.32 | 0.04 | BALANCE | 0.8 | 1.65 |
| EXAMPLE 11 | 9.70 | 0.47 | 0.33 | 0.05 | BALANCE | 0.8 | 1.52 |
| EXAMPLE 12 | 9.65 | 0.46 | 0.34 | 0.01 | BALANCE | 0.8 | 1.68 |
| COMPARATIVE EXAMPLE 1 | 12.00 | 0.48 | 0.33 | 0.04 | BALANCE | 0.8 | 2.10 |
| COMPARATIVE EXAMPLE 2 | 9.40 | 0.46 | 0.33 | 0.04 | BALANCE | 0.8 | 1.60 |
| COMPARATIVE EXAMPLE 3 | 9.65 | 1.00 | 0.34 | 0.04 | BALANCE | 0.8 | 1.68 |
| COMPARATIVE EXAMPLE 4 | 9.70 | 0.43 | 0.33 | 0.04 | BALANCE | 0.8 | 1.66 |
| COMPARATIVE EXAMPLE 5 | 9.65 | 0.47 | 0.39 | 0.04 | BALANCE | 0.8 | 1.67 |
| COMPARATIVE EXAMPLE 6 | 9.60 | 0.48 | 0.31 | 0.04 | BALANCE | 0.8 | 1.69 |
| COMPARATIVE EXAMPLE 7 | 9.80 | 0.48 | 0.34 | 0.06 | BALANCE | 0.8 | 1.70 |
| COMPARATIVE EXAMPLE 8 | 9.70 | 0.46 | 0.35 | 0.005 | BALANCE | 0.8 | 3.20 |
| COMPARATIVE EXAMPLE 9 | 9.65 | 0.46 | 0.33 | 0.04 | BALANCE | 0.8 | 1.67 |

| | NiP PLATING FILM THICKNESS (μm) | YOUNG'S MODULUS E (GPa) | DENSITY ρ (g/cm³) | E/ρ | FLUTTERING (μm) | PROCESSABILITY |
|---|---|---|---|---|---|---|
| EXAMPLE 1 | 10 | 79.9 | 2.72 | 29.38 | 3.3 | ◉ |
| EXAMPLE 2 | 20 | 83.0 | 2.85 | 29.12 | 3.1 | ◉ |
| EXAMPLE 3 | 10 | 80.7 | 2.75 | 29.35 | 3.5 | ◉ |
| EXAMPLE 4 | 20 | 84.6 | 2.91 | 29.07 | 3.5 | ◉ |
| EXAMPLE 5 | 10 | 81.2 | 2.72 | 29.85 | 3.5 | ○ |
| EXAMPLE 6 | 10 | 79.8 | 2.72 | 29.34 | 3.4 | ○ |
| EXAMPLE 7 | 10 | 79.7 | 2.72 | 29.30 | 3.4 | ○ |
| EXAMPLE 8 | 10 | 80.0 | 2.72 | 29.41 | 3.5 | ○ |
| EXAMPLE 9 | 10 | 79.8 | 2.72 | 29.34 | 3.4 | ○ |
| EXAMPLE 10 | 10 | 79.7 | 2.72 | 29.30 | 3.4 | ○ |
| EXAMPLE 11 | 10 | 79.8 | 2.72 | 29.34 | 3.4 | ○ |
| EXAMPLE 12 | 10 | 79.6 | 2.72 | 29.26 | 3.5 | ○ |
| COMPARATIVE EXAMPLE 1 | 10 | 81.4 | 2.71 | 30.04 | 4.4 | X |
| COMPARATIVE EXAMPLE 2 | 10 | 78.5 | 2.72 | 28.86 | 3.6 | X |
| COMPARATIVE EXAMPLE 3 | 10 | 79.9 | 2.73 | 29.27 | 3.6 | X |
| COMPARATIVE EXAMPLE 4 | 10 | 78.9 | 2.73 | 28.90 | 3.7 | X |
| COMPARATIVE EXAMPLE 5 | 10 | 79.9 | 2.72 | 29.38 | 3.7 | X |
| COMPARATIVE EXAMPLE 6 | 10 | 79.8 | 2.72 | 29.34 | 3.7 | X |
| COMPARATIVE EXAMPLE 7 | 10 | 79.9 | 2.72 | 29.38 | 3.7 | X |
| COMPARATIVE EXAMPLE 8 | 10 | 79.5 | 2.72 | 29.23 | 4.5 | X |
| COMPARATIVE EXAMPLE 9 | 6 | 78.3 | 2.71 | 28.89 | 3.9 | X |

(Formation of Electroless Plating Film)

On the surface of the aluminum alloy substrate, plating films with the thicknesses illustrated in Table 1 were formed according to Ni88P12 composition (plating film composition). Heating temperature after the plating was 300 degrees Celsius for three minutes.

(Polishing Processing)

Polishing processing was performed by using a three-stage wrapping machine, with a pair of upper and lower platens, as a polishing machine. At this time, a suede type (manufactured by Filwel) was used for the polishing pad. Further, an alumina abrasive grain with 0.5 µm D50 was used in the first stage polishing, a colloidal silica abrasive grain with 30 nm D50 was used in the second stage polishing, and a colloidal silica abrasive grain with 10 nm D50 was used in the third stage polishing. The polishing time was five minutes for each stage.

(Evaluation)

Young's modulus was measured for the manufactured magnetic recording medium substrates. The Young's modulus measurements were performed at normal temperature based on the Japanese Industrial Standards JIS 2280-1993. Test pieces were 50 mm (length) by 10 mm (width) by 1.0 mm (thickness) rectangular parallelepiped shapes.

Further, the surface was observed by using a differential interference type optical microscope with magnification 1000 times, and the machinability of the aluminum alloy substrate was evaluated based on the flatness. The machinability was evaluated by three levels: "superior", "usable range", and "inferior". The results are illustrated in Table 1. It should be noted that "superior" is indicated by "⊙", "usable range" is indicated by "○", and "inferior" is indicated by "X" in Table 1. According to Table 1, the machinability of the magnetic recording medium substrates in the examples 1 to 4 was "superior", the machinability of the magnetic recording medium substrates in the examples 5 to 12 was "usable range", and the machinability of the magnetic recording medium substrates in the comparative examples 1 to 9 was "inferior".

Further, the manufactured magnetic recording medium substrates were rotated at 10000 rpm, and the fluttering generated on the outermost peripheral surfaces of the magnetic recording medium substrates was measured by using a He—Ne laser displacement meter. The measurement results are illustrated in Table 1. The fluttering of the magnetic recording medium substrates in the examples 1 to 12 was 3.5 µm or less, and the fluttering of the magnetic recording medium substrates in the comparative examples 1 to 9 was 3.6 µm or more, and thus, the fluttering of the magnetic recording medium substrates in the examples 1 to 12 was less than the fluttering of the magnetic recording medium substrates in the comparative examples 1 to 9.

The present invention is not limited to the specifically disclosed embodiments, and variations and modifications may be made without departing from the scope of the present invention.

The present application is based on and claims the benefit of priority of Japanese Priority Application No. 2016-136290 filed on Jul. 8, 2016, the entire contents of which are hereby incorporated herein by reference.

What is claimed is:

1. A magnetic recording medium substrate in which a NiP plating film is formed on a surface of an aluminum alloy substrate,
    wherein the aluminum alloy substrate includes Si in a range of 9.5 mass % or more and 11.0 mass % or less, Mn in a range of 0.45 mass % or more and 0.90 mass % or less, Zn in a range of 0.32 mass % or more and 0.38 mass % or less, Sr in a range of 0.01 mass % or more and 0.05 mass % or less,
    wherein an average particle diameter of Si particles in an alloy structure of the aluminum alloy substrate is 2 µm or less,
    wherein film thickness of the NiP plating film is 7 µm or more, and
    wherein an outer diameter of the magnetic recording medium substrate is 53 mm or more, thickness of the magnetic recording medium substrate is 0.9 mm or less, and Young's modulus (E) of the magnetic recording medium substrate is 79 GPa or more.

2. The magnetic recording medium substrate according to claim 1, wherein, in the aluminum alloy substrate, Mg content is 0.01 mass % or less, or Mg is not included.

3. The magnetic recording medium substrate according to claim 1, wherein, in a case where density is $\rho$ (g/cm$^3$), E/$\rho$ of the magnetic recording medium substrate is 29 GPa*cm$^3$/g or more.

4. A hard disk drive that uses the magnetic recording medium substrate according to claim 1,
    wherein the hard disk drive uses six or more of the magnetic recording medium substrate.

5. The hard disk drive according to claim 4, wherein the inside of a hard disk drive case of the hard disk drive includes air.

6. The hard disk drive according to claim 4, wherein the hard disk drive is a 3.5 inch standardized hard disk drive.

* * * * *